United States Patent
Rinaldi et al.

(10) Patent No.: US 12,523,294 B2
(45) Date of Patent: Jan. 13, 2026

(54) BARREL CAM ACTUATOR FOR A TRANSMISSION

(71) Applicant: DANA ITALIA S.R.L., Trentino (IT)

(72) Inventors: Pier Paolo Rinaldi, Arco (IT);
Giacomo Faggiani, Rovereto (IT);
Lorenzo Serrao, Torbole sul Garda (IT)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 18/509,097

(22) Filed: Nov. 14, 2023

(65) Prior Publication Data
US 2025/0155019 A1 May 15, 2025

(51) Int. Cl.
*F16H 63/18* (2006.01)
*F16H 61/28* (2006.01)
*F16H 61/32* (2006.01)
*F16H 63/32* (2006.01)

(52) U.S. Cl.
CPC ..... *F16H 63/18* (2013.01); *F16H 2061/2823* (2013.01); *F16H 2061/323* (2013.01); *F16H 2063/321* (2013.01)

(58) Field of Classification Search
CPC ............ F16H 63/18; F16H 2061/2823; F16H 2061/323; F16H 2063/321
See application file for complete search history.

(56) References Cited

U.S. PATENT DOCUMENTS

| | | | | |
|---|---|---|---|---|
| 6,003,649 | A * | 12/1999 | Fischer | F16H 63/30 192/3.61 |
| 6,220,109 | B1 | 4/2001 | Fischer et al. | |
| 7,363,834 | B2 * | 4/2008 | Kapp | F16H 63/18 74/337.5 |
| 8,402,859 | B2 | 3/2013 | Neelakantan et al. | |
| 10,364,889 | B2 * | 7/2019 | Adachi | F16H 3/006 |
| 10,982,765 | B2 | 4/2021 | Maki | |
| 2012/0017716 | A1 * | 1/2012 | Neelakantan | F16H 61/30 74/473.11 |
| 2018/0094554 | A1 * | 4/2018 | Kaan | F01L 1/34 |
| 2022/0221053 | A1 | 7/2022 | Zhong et al. | |

FOREIGN PATENT DOCUMENTS

| | | | |
|---|---|---|---|
| JP | 5707119 B2 | 4/2015 | |
| JP | 2015081634 A | 4/2015 | |

OTHER PUBLICATIONS

Rinaldi, P. et al., "System and Method for Seamless Shifting in a Dual Motor Transmission With Minimal Gears," U.S. Appl. No. 18/161,790, filed Jan. 30, 2023, 39 pages.
Rinaldi, P. et al., "System and Method for Sshifting in a Dual Motor Transmission," U.S. Appl. No. 18/450,951, filed Aug. 16, 2023, 39 pages.

* cited by examiner

*Primary Examiner* — Victor L Macarthur
(74) *Attorney, Agent, or Firm* — McCoy Russell LLP

(57) ABSTRACT

Methods and systems for a barrel cam actuator assembly. The barrel cam assembly, in one example, includes a barrel cam including a first track and a bearing that is positioned at a side of the barrel cam. The barrel cam assembly further includes a spring that are is positioned between a housing and the bearing, where the bearing and the spring are configured to provide axial compliance to the barrel cam.

16 Claims, 11 Drawing Sheets

BARREL CAM ACTUATOR FOR A TRANSMISSION

TECHNICAL FIELD

The present description relates generally to a barrel cam actuator for a transmission. More specifically, the present disclosure relates to an elastic barrel cam actuator assembly.

BACKGROUND AND SUMMARY

Some vehicles include transmissions which provide speed-torque conversions with regard to mechanical power generated by a prime mover such as an engine or motor and transferred to drive wheels. Certain transmissions include clutches which facilitate shifts between discrete gear ratios. Shift forks have been used to engage and disengage clutches, such as dog clutches.

In some transmissions, barrel cam actuators are used due to their ability to efficiently provide smooth and controlled movement of a gear shift mechanism. Barrel cam actuators additionally exhibit higher reliability and are able to withstand higher levels of stress and wear when compared to other types of actuators, in some cases. These barrel cam actuator characteristics may make them particularly suitable for higher performance vehicles and industrial machinery, for instance. Although barrel cams may be deployed in a wide variety of transmissions and vehicles such as manual and automatic transmissions as well as all-electric vehicles and hybrid electric vehicles (HEVs).

The inventors have recognized that barrel cam actuators may exhibit greater complexity than other actuation systems and that certain barrel cam actuators may exhibit constrained range of motion due to the shape of the cam which may make the barrel cam actuator undesirable for certain applications, in some instances. To elaborate, during shifting transients, clutches may experience a condition where the clutch faces are arranged such that they impede the engagement stroke. This condition is referred to as a blocked condition. The blocked condition increases the chance of actuation system degradation. For instance, clutch actuators that utilize electric motors may stall the motor due to the clutch binding, in certain scenarios, due to the actuation system being unable to exhibit enough compliance to reduce the chance (e.g., avoid) of the clutch exhibiting a block condition during engagement. Motor stall may degrade the actuation motor and/or its power electronics. Further, even if degradation does not occur due to actuator stall, the actuator starts from zero speed, thereby delaying clutch engagement or missing clutch engagement, entirely, in some scenarios. As such, the inventors have recognized a desire to increase compliance in clutch actuators to reduce the likelihood of clutch binding. However, the inventors have recognized that tradeoffs may exist between actuation system compliance and clutch performance and functionality.

The issues described above may be addressed by a barrel cam actuator assembly. The barrel cam actuator assembly, in one example, includes a barrel cam with a first track and a first bearing that are positioned at opposing sides of the barrel cam. The barrel cam assembly further includes a spring that is positioned between a housing and the first bearing. In such an example, the first bearing and the spring are configured to provide axial elasticity to the barrel cam. In this way, the amount of compliance in the assembly and specifically the barrel cam is increased. To elaborate, when a blocked condition occurs in a clutch corresponding to the barrel cam actuation system, the energy delivered by an actuator (such as an actuation motor) is able to be accumulated in the pair of springs, reducing the chance of actuator stall. Next, when the blocked condition is removed and the mated teeth position is verified, the system will face less resistance and the accumulated energy will be released, thereby completing the engagement. In this way, the actuation assembly is able to withstand the face-to-face condition, therefore reducing the chance of actuator stall and enabling the assembly to quickly move the clutch from a blocked condition to an engaged condition without additional complex control features, if so desired.

In yet another example, the barrel cam actuator assembly may further include a cam follower with a first end positioned within one track and a second end positioned within the shift fork via a second bearing. In this way, rolling friction between the cam follower and the shift fork is achieved which reduces actuation hysteresis.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
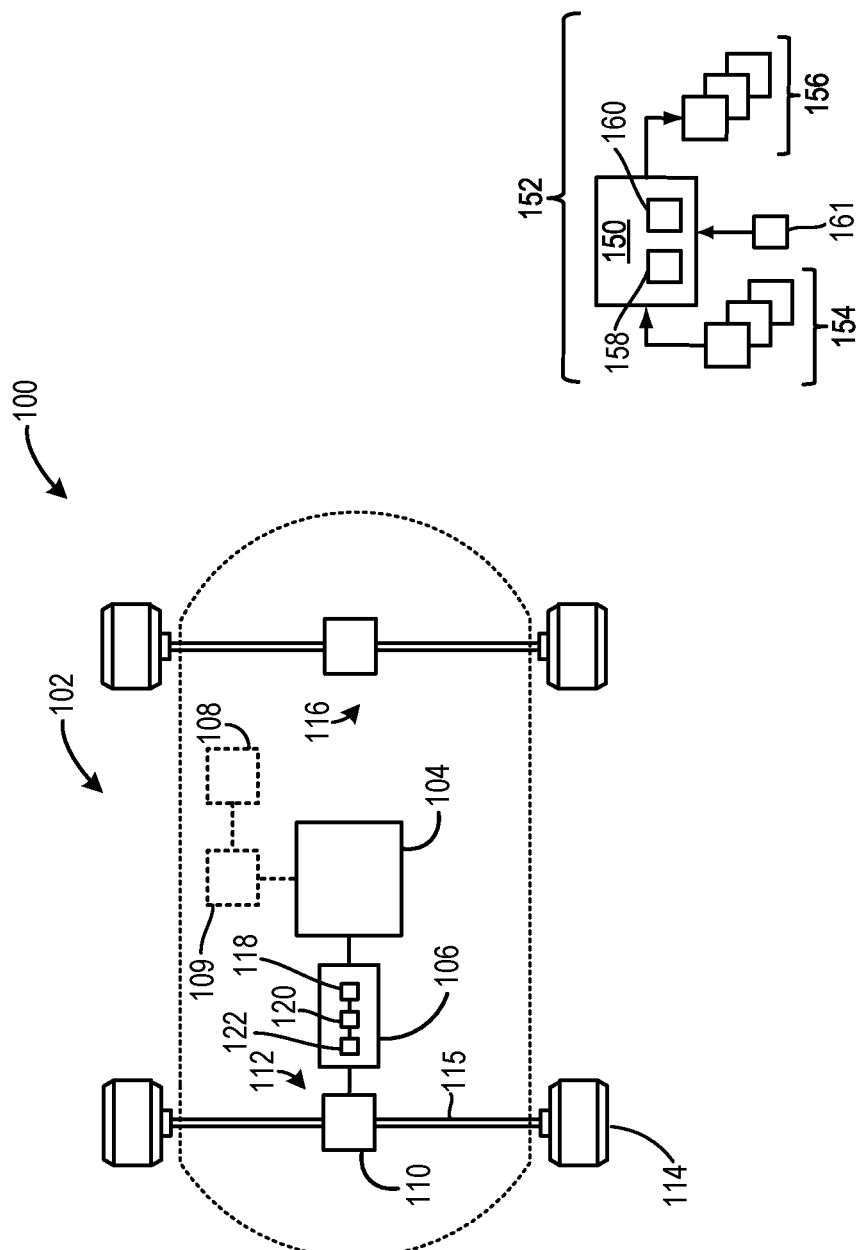
FIG. 1 shows an example of a vehicle system with a transmission.

Dog clutches are used in some transmissions to engage and disengage gears. Dog clutches include two interlocking pieces which mate with one another to engage gears. As such, in one example, when the dog clutch is engaged, the mating surfaces are locked together, allowing the gear to rotate with the shaft. When the clutch is disengaged, the mating surfaces are separated, allowing the gear to rotate freely. Dog clutches may generally exhibit lower power losses than other types of clutches such as friction clutches, for instance. To expound, dog clutches may not experience drag torque that arises from viscous friction of the oil trapped in the clearance between the sliding surfaces of the wet friction clutch. Dog clutch may additionally have fewer components and experience greater reliability than friction clutches, in some cases. Further, in electric powertrains, the performance of the traction motor may enable the number of gear ratios in the transmission to be reduced. However, this may lead to higher speed gaps at the clutches which may not be attainable by some friction clutches. Due to a residual small differential speed between the two elements of the dog clutch, the desirable condition to engage is intermittent, with time windows where the engagement is possible followed by time windows where it is impeded. The time windows length depends on differential speed and dog clutch design. At lower differential speeds, the gearshift may be less abrupt, but the time windows will be longer so the exposure to face-to-face event and the time to recover may also be increased. There may also be a theoretical condition of a null differential speed and infinite time window. In electric vehicle applications, the differential speed can be commanded to a target value by a control logic that uses the traction motor. When the engagement condition is verified, a lowest force is demanded to complete the engagement. If the condition is not guaranteed, during the engagement stroke the teeth of both parts will stop in a face-to-face match thus impeding the engagement and causing the actuation motor to stall. When the actuator in the actuation assembly is an electric motor, motor stalling may occur during a face to face clutch conditions also referred to as a blocked condition. In previous actuation systems, the electric motor stall can lead to different issues that span from overcurrent to degraded dynamic response. The overcurrent may degrade the electric motor and/or its power electronic, in some instances. Even if component degradation in the actuation system does not occur, the motor starts from zero speed again to engage, and this delay may result in missing the favorable time window, grinding noise, and/or not completing the engagement.

The following description relates to a barrel cam actuator assembly for a transmission of a vehicle. The barrel cam actuator assembly is designed with axial elasticity that allows the assembly to effectively store energy during a blocked condition of a clutch, for example. To elaborate, the mechanical elasticity of the actuation assembly may allow for the accumulation of the energy generated by an actuation motor or other suitable actuator, thereby reducing the chance of the motor stalling. When the blocking condition is removed (e.g., and the desired teeth positions is verified) the actuation assembly faces less resistance and the accumulated energy is released, completing the engagement. In this way, the likelihood of actuation motor stalling is reduced and the clutch can be quickly engaged after the blocked condition is discontinued. Further, this quick clutch engagement and reduced likelihood of motor stall may be achieved without any additional control features, if so desired.

FIG. 1 shows a schematic depiction of a vehicle 100 with a powertrain 102 (e.g., an electric powertrain) that may include a prime mover 104 and a transmission 106. In some examples, the prime mover 104 may be an electric motor (e.g., a traction motor). In such an example, the electric motor may be electrically connected to an energy storage device 108 (e.g., one or more traction batteries, capacitors, fuel cells, combinations thereof, and the like). Further, in the electric motor example, the motor may be configured to operate as a generator, during selected conditions, to provide electrical power to charge the energy storage device 108, for example. In other examples, the prime mover 104 may be an internal combustion engine. Therefore, the vehicle 100 may be a hybrid vehicle, an all-electric vehicle, or an internal combustion engine vehicle.

In the electric motor example, the powertrain 102 may include an inverter 109 which converts alternative current (AC) to direct current (DC) and vice versa. The inverter 109 may be electrically coupled to the energy storage device 108 and the prime mover 104 which is a traction motor, in such an example.

In the illustrated example, the transmission 106 delivers mechanical power to a differential 110 of an axle assembly 112 that includes drive wheels 114. The axle assembly 112 includes axle shafts 115 (e.g., half shafts) that rotationally couple the drive wheels 114 and the differential 110. Although other axle configurations are possible. Further, it will be appreciated that the transmission 106 may additionally or alternatively deliver mechanical power to the other axle 116 in the vehicle 100 and/or deliver mechanical power to the drive wheels via alternate or additional suitable components. Still further, in other examples, the transmission may be incorporated into one of the axles to form an electric axle assembly. In the electric axle example, an internal combustion engine may provide mechanical power to the other axle, in some cases.

The transmission 106 (e.g., a gearbox) is rotationally coupled to the prime mover 104 via a shaft (e.g., a drive shaft) and/or other suitable mechanical component(s). The transmission 106 may include a barrel cam actuator assembly 118 that is designed with a targeted amount of axial compliance to reduce the chance of motor degradation when the clutches experience a blocked condition. The barrel cam actuator assembly 118 is schematically depicted in FIG. 1. However, it will be understood that the barrel cam actuator assembly 118 has greater structural complexity and the features of the assembly that provide the targeted amount of axial compliance are expanded upon herein with regard to FIGS. 2A-9.

Figure 7A:
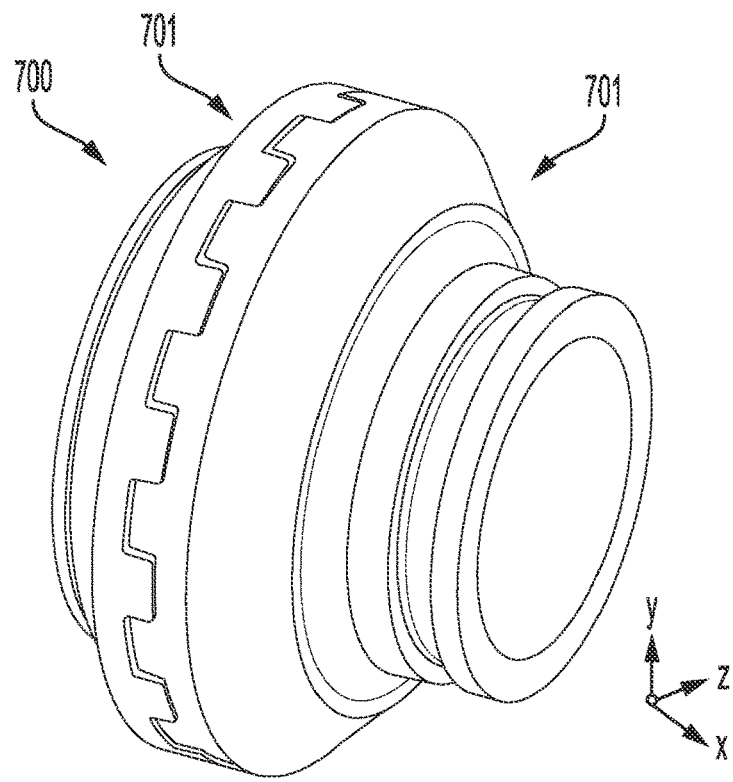
FIGS. 7A-7B show an example of a dog clutch.
Figure 7B:
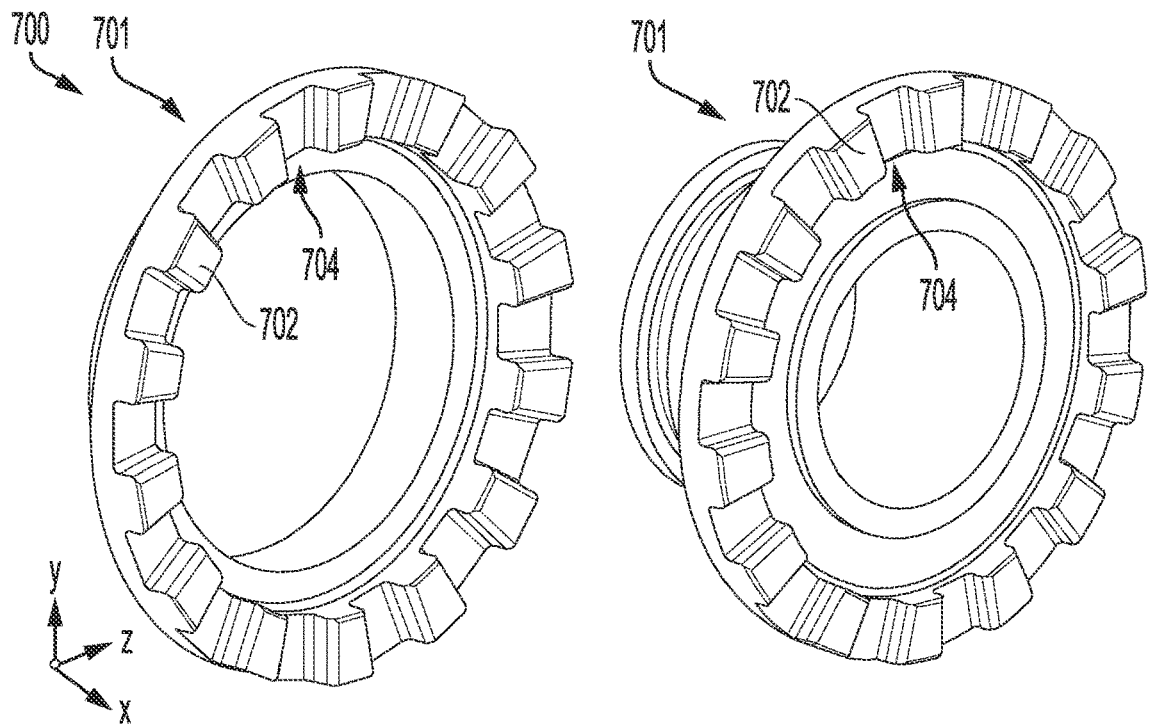
Figure 8:
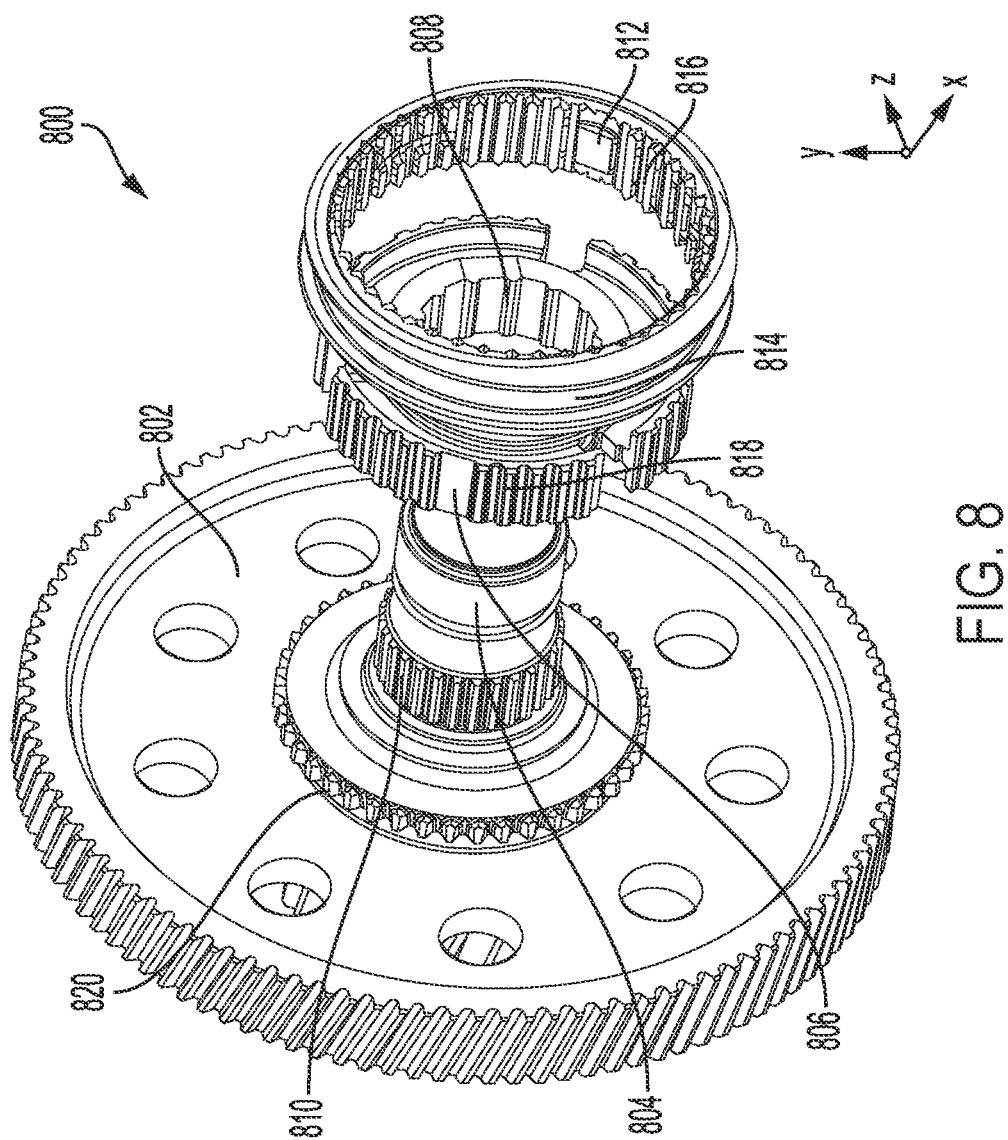
FIG. 8 shows another example of a dog clutch.

The barrel cam actuator assembly 118 includes a barrel cam and may include an actuation motor, one or more shift forks, and one or more cam followers, for instance. The shift forks are configured to engage and disengage clutches 120. In turn, the clutches are configured to engage and disengage gears 122 to allow the transmission to shift between discrete operating gear ratios. For instance, to shift between gears, one clutch may be engaged and another clutch may be disengaged. One or more of the clutches 120 may specifically be dog clutches such as a face ring dog clutch where the toothed faces are on axial sides of two parts of the clutch. Further, in one example, one or more of the clutches may specifically be a dog clutch where the toothed faces are positioned on circumferential surfaces of the clutch sections. Examples of a face type dog clutch and another type of dog clutch are illustrated in FIGS. 7A-7B and FIG. 8 respectively and discussed in greater detail herein. Further, one or more of the clutches may be a synchronizer where friction elements (e.g., friction cones) are used to decrease the speed variance between the components in the clutch for smoother engagement.

During drive operation (e.g., forward drive or reverse drive operation) the mechanical power paths in the powertrain may flow from the prime mover 104 to the transmission 106, from the transmission to the differential 110, and from the differential to the drive wheels 114 via axle shafts 115 (e.g., half shafts).

A controller 150 (e.g., electronic control unit (ECU)) may form a portion of a control system 152. The controller may include memory 158 that is executable by a processor 160 to implement the methods, control strategies, and the like discussed herein. The control system 152 is shown receiving information from sensors 154 and sending control signals to actuators 156. As one example, the sensors 154 may include sensors such as a battery level sensor, clutch position sensors, etc. As another example, the actuators 156 may include the barrel cam actuation assembly 118, etc. The shift fork actuator may be configured to move a clutch (e.g., a dog clutch or a synchronizer) into and out of engagement with one or more gears of the transmission 106. The controller 150 may receive input data from the sensors, process the input data via a processor, and trigger the actuators in response to the processed input data based on instruction or code programmed therein corresponding to one or more routines. In some examples, the controller 150 may include instructions that send a command signal to the barrel cam actuator assembly 118 to engage or disengage one of the clutches 120 which may in turn alter the operating gear ratio in the transmission. To elaborate, a control command may be sent to an actuation motor to rotate a barrel cam. The control techniques described herein may be stored as instructions in the controller 150 that are executable by the processor 160. As such, the control techniques, methods, and the like expanded upon herein may be stored as instructions in non-transitory memory. Input device(s) 161 (e.g., a gear selector, a drive mode selector, an accelerator pedal, a brake pedal, combinations thereof, and the like) may provide input to the controller that is indicative of an operator's intent for vehicle control.

Figure 2A:
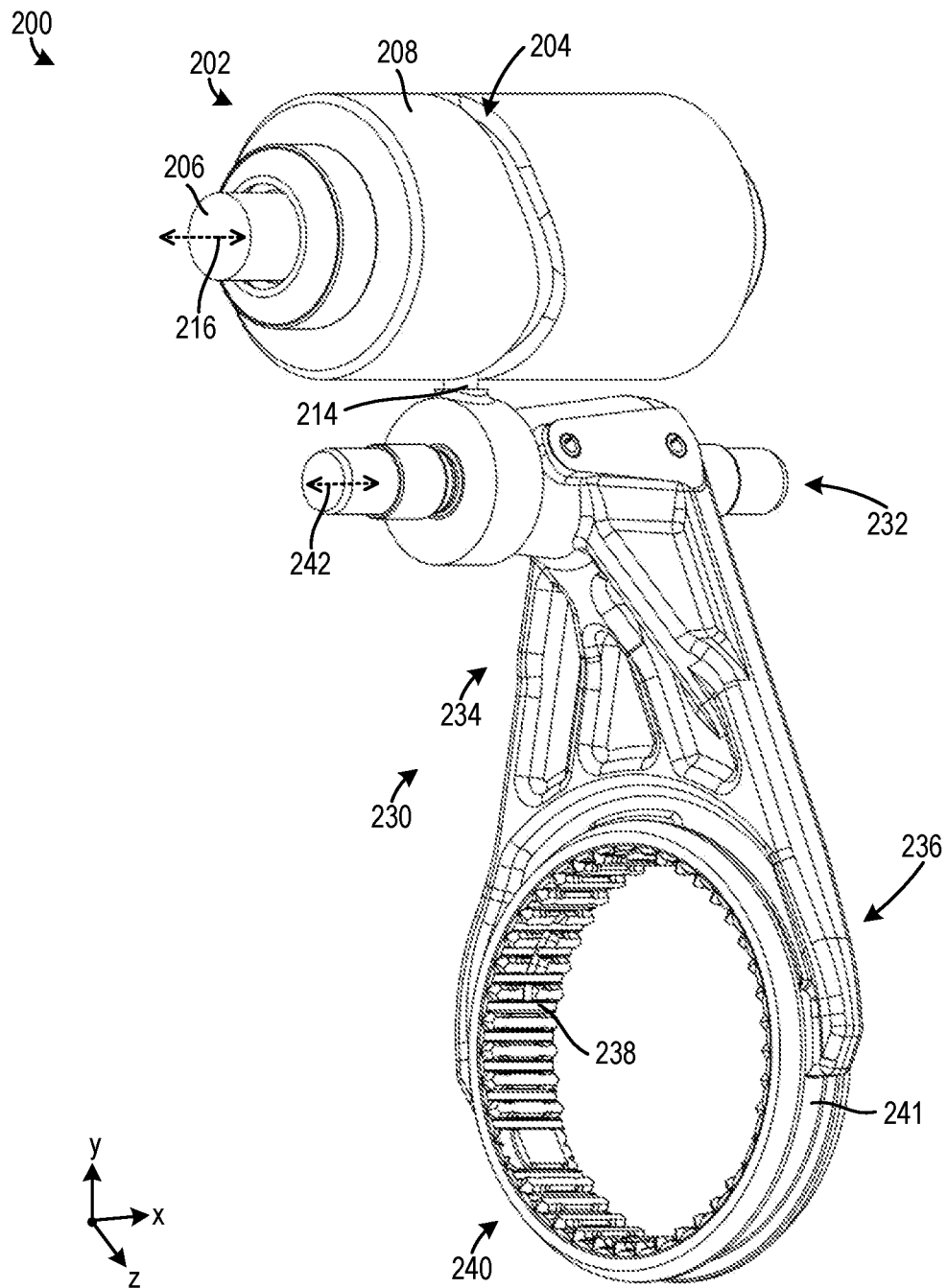
FIGS. 2A-2B show different views of an example of a barrel cam actuator assembly.
Figure 2B:
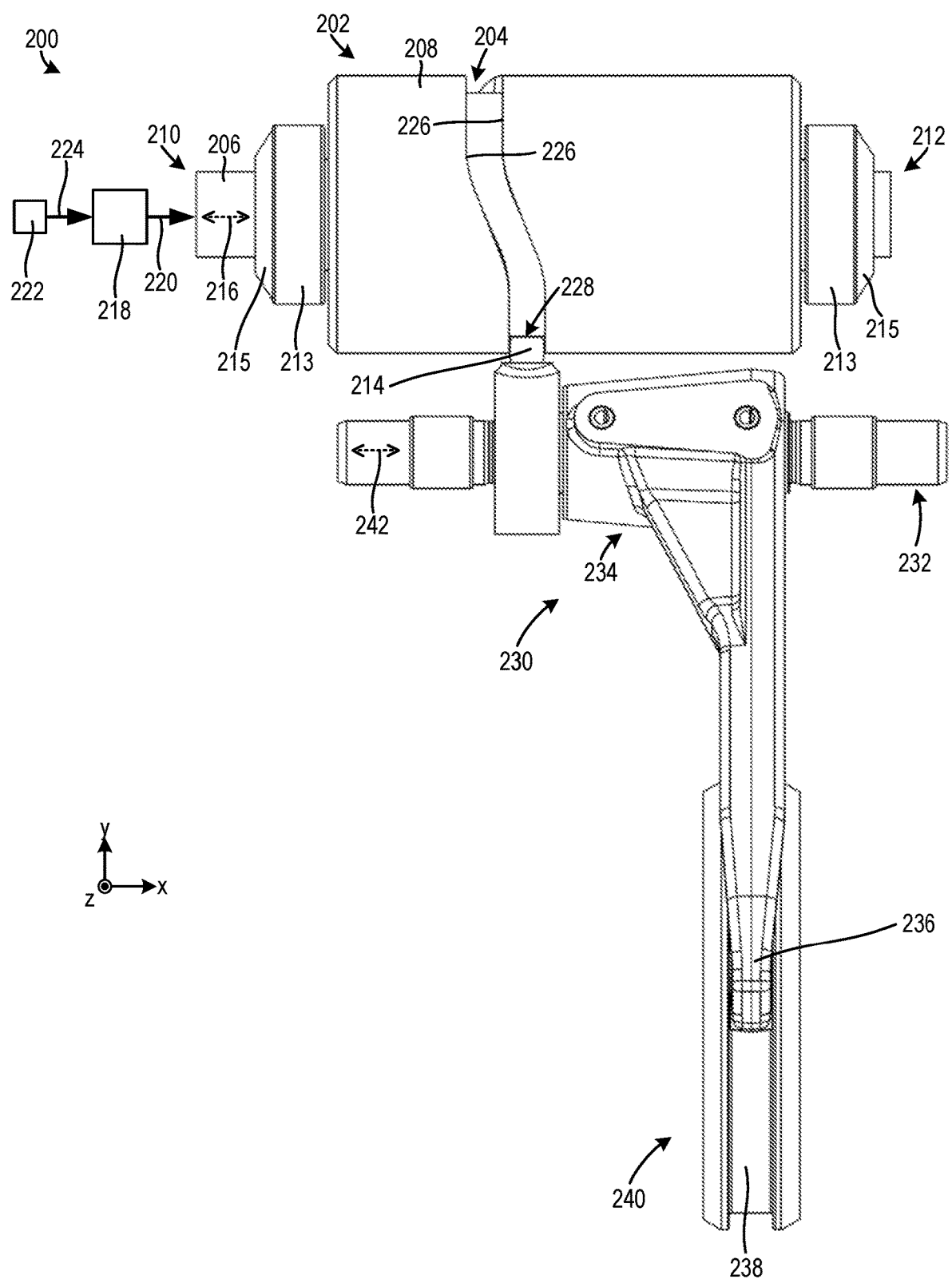

FIG. 2A-2B show an example of a barrel cam actuator assembly 200. The barrel cam actuator assembly 200 includes a barrel cam 202. In the illustrated example, the barrel cam 202 includes one track 204. However, it will be understood that the barrel cam 202 may include additional tracks as discussed in greater detail herein with regard to FIGS. 3-4B.

The barrel cam 202 includes a shaft 206 and a tracked body 208. The tracked body 208 includes the track 204. The shaft 206 includes a first end 210 and a second end 212. These ends may be rotatably coupled to a housing via bearings 213 and springs 215 to provide compliance (e.g., axial compliance) to the barrel cam 202. The bearings 213 may be ball bearings, in one example. Further, the springs 215 may be cup springs. However, in other examples, the barrel cam may be rotationally and elastically coupled to a housing via a single spring and a single bearing or more than two springs and bearings. The compliant interface between the housing and the springs and bearing is expanded upon herein with regard to the example barrel cam actuator assembly depicted in FIGS. 4A-5.

The track 204 at least partially extends circumferentially around the barrel cam. Further, the track 204 is formed as a recess in the outer surface of the barrel cam. The profile (e.g., axial profile) of the track enables an axial position of a cam follower 214 to be adjusted based on the rotational position of the barrel cam about an axis 216.

In the illustrated example, an actuation motor 218 which is schematically depicted in FIGS. 2A-2B is coupled to the barrel cam 202. Arrow 220 indicates the mechanical connection between the actuation motor 218 and the barrel cam 202. The actuation motor 218 includes a rotor and a stator that electromagnetically interact to induce rotation of a rotor shaft. Further, the actuation motor 218 may be electrically coupled to a battery 222 and/or other suitable energy storage device (e.g., a capacitor, a flywheel, and the like). Arrow 224 indicates the electrical connection between the battery and/or other suitable energy storage device and the actuation motor 218. However, in an alternate example, other suitable actuators that are configured to rotate the barrel cam may be used.

A gear train may be used to adjust barrel speed to motor speed and find a compromise between torque delivered at the barrel cam and shifting speed, in one example. However, in other examples, the actuation motor 218 may be directly coupled to the barrel cam 202 or may be coupled to the barrel cam using other suitable mechanical components. In one use-case example, the actuation motor may have a top speed in the range 4000-5000 revolutions per minute (RPM) and a peak torque in the range 1-2 newton meters (Nm) and the drivetrain reduction ratio may be between 18 and 20. However, the motor may have a different top speed and/or peak torque in other examples. Further, the drivetrain reduction ratio may be within a different range, in alternate embodiments. The motor and drivetrain characteristics may be selected based on end-use design targets, the types of clutches used in the transmission, prime mover configuration, and the like.

The track 204 includes opposing walls 226 that axially capture a first end 228 of the cam follower 214. The first end 228 may have a spherical shape. A second end of the cam follower 214 is mated with a section of a shift fork 230. The second end may have a cylindrical shape. Designing the ends of the cam follower with spherical and cylindrical shapes allows enhanced contact between the cam follower and the shift fork 230 even when a shift fork rod 232 is bending. The second end of the cam follower 214 may be coupled to the shift fork 230 via a bearing (e.g., a needle roller bearing) which is discussed in greater detail herein with regard to FIG. 5.

The shift fork 230 includes a body 234 in the illustrated example. Further, in the illustrated example, the shift fork 230 includes prongs 236 (e.g., circumferentially shaped prongs) that extend from the body 234 and interface with a portion 238 of a clutch 240. The portion 238 of the clutch is illustrated as a shift sleeve which may be included in a synchronizer. The shift sleeve includes a circumferential recess 241 that mates with the prongs 236. However, the clutch may be a face dog ring style clutch, in other examples. A central axis 242 of the shift fork rod 232 is further depicted in FIGS. 2A-2B for reference.

FIGS. 2A-5 and 7A-9 include a coordinate system to orient the views. The y-axis may be a vertical axis (e.g., parallel to a gravitational axis), the x-axis may be a longitudinal axis (e.g., horizontal axis), and/or the z-axis may be a lateral axis, in one example. However, the axes may have other orientations, in other examples.

Figure 3:
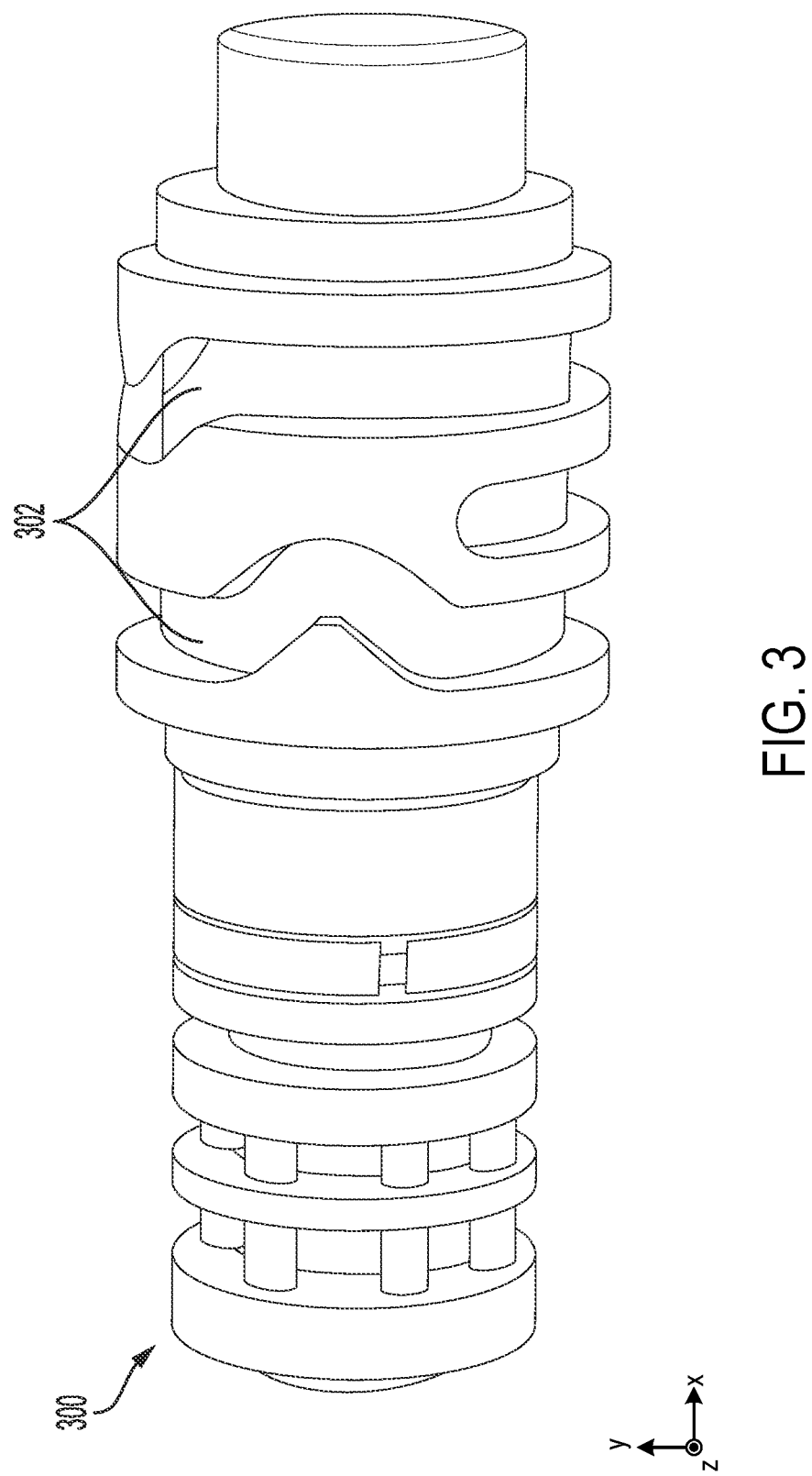
FIG. 3 shows an example of a barrel cam.

FIG. 3 shows an example of a barrel cam 300. The barrel cam 300 as well as the other barrel cams described herein may be utilized in any of the barrel cam actuator assemblies described herein. The barrel cam 300 includes multiple tracks 302. When installed in the actuator assembly, each of the tracks mates with a cam follower which is coupled to a shift fork to facilitate axial translation of the shift fork. The profiles of the tracks 302 may be designed to actuate clutches associated with the shift forks at desired time intervals. For instance, the tracks may be profiled to engage one clutch while disengaging another clutch. However, in alternate examples, the tracks may be profiled to engage one clutch while the remaining clutches are sustained in disengaged states. The profiles of the tracks may be selected based on desired shifting characteristics in the transmission.

The barrel cam 300 may include one or more detents, in another example. To elaborate, in such an example, the detents are configured to maintain the barrel cam in a stable position. To accomplish this functionality, balls which are preloaded via springs may be mated with the detents. In this way, the barrel cam may be maintained at rest. However, in other examples, the detents, balls, and springs may be omitted from the actuator assembly.

Figure 4A:
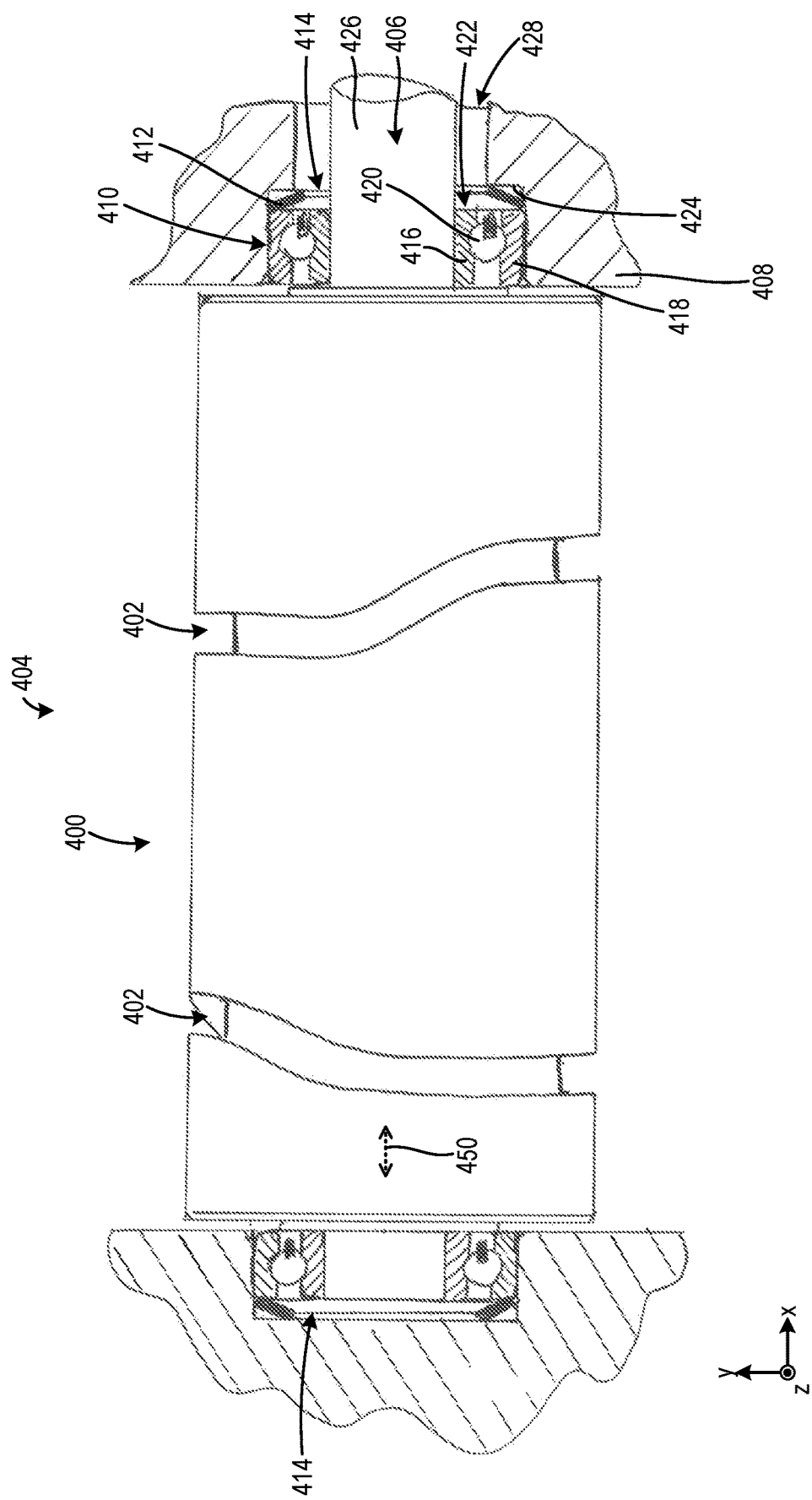
FIGS. 4A-5 show an example of a barrel cam actuator assembly with axial elasticity.

FIG. 4A shows yet another example of a barrel cam 400 with multiple tracks 402. The barrel cam 400 and associated components are included in a barrel cam actuator assembly 404. The barrel cam 400 includes a shaft 406 which is mounted in a housing 408 (e.g., transmission housing) via a pair of bearings 410 and a pair of springs 412 at opposing axial sides 414. In another example, a single bearing and a single spring may be used in the actuator assembly to rotationally attach the barrel cam to the housing. In another alternate example, more than two springs and bearings may be used in the actuator assembly to rotationally attach the barrel cam to the housing.

Each of the bearings 410 includes an inner race 416 that interfaces with the shaft 406 and an outer race 418 that interfaces with the housing 408. To elaborate, the inner races 416 may be interference fit with the shaft 406 and the outer races 418 may be sliding fit with the housing to allow the barrel cam 400 to move axially. Roller elements 420 which are depicted as balls in the illustrated example are positioned between the inner and outer races. In other examples, the roller elements in the bearings may be tapered cylindrical rollers.

Each of the springs 412 are positioned between an outboard axial side 422 of the associated bearing and a wall 424 of the housing 408. The springs 412 are specifically depicted as cup springs which allow the space efficiency of the assembly to be increased. However, other suitable types of springs may be used in the actuator assembly in other examples, such as coil springs, wave springs, combinations thereof, and the like. Using coil springs may however decrease the assembly's space efficiency.

A section 426 of the shaft 406 is rotationally coupled to an actuation motor or other suitable rotational actuator. An opening 428 in the housing 408 allows the shaft section 426 to pass therethrough. The diameter of the opening 428 may be smaller than an inner diameter of the spring 412.

The springs 412 may be substantially equivalently preloaded such that they counteract one another. The preload may be in a direction that is parallel to a central axis 450 of the barrel cam 400. The balance of the spring preloads results in a nominal position of the barrel cam. In this way, the barrel cam is able to exhibit desired axial compliance characteristics.

Figure 4B:
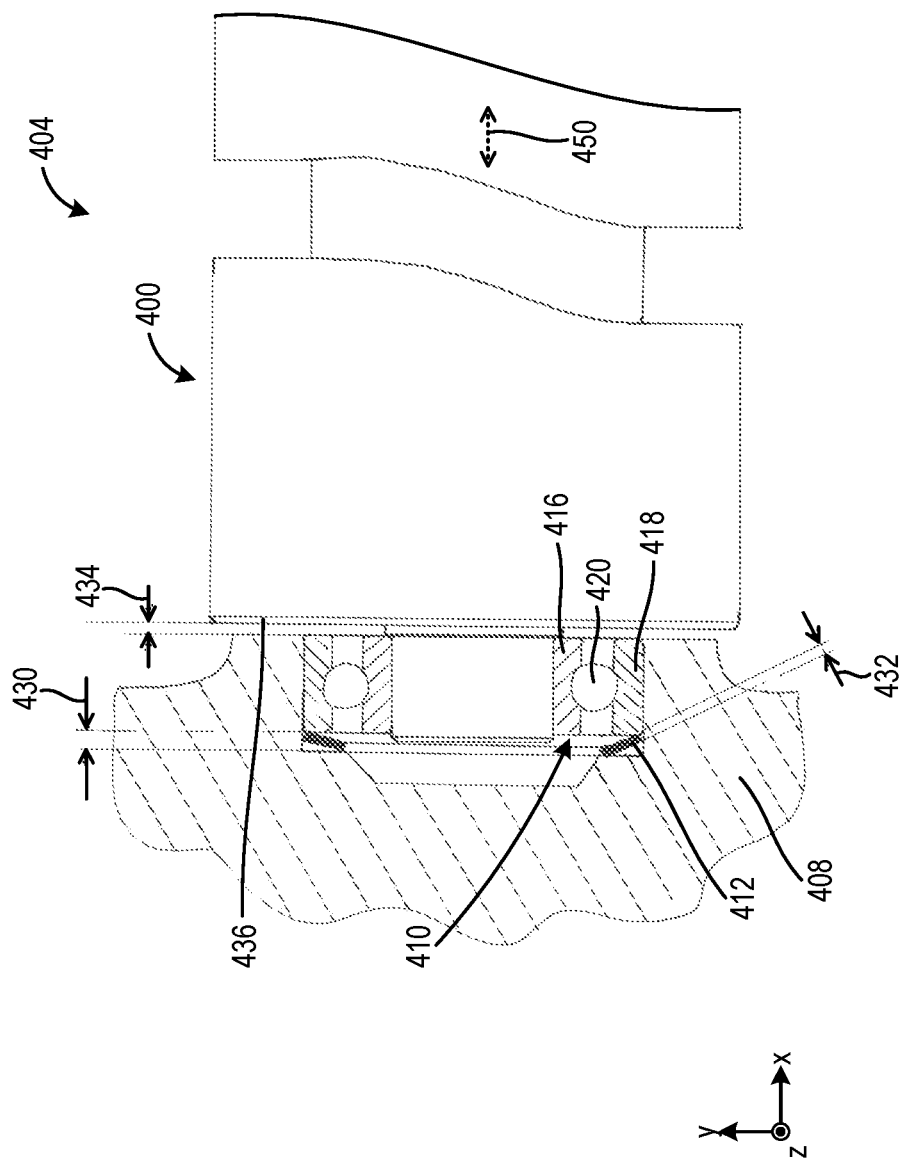

FIG. 4B shows a detailed view of the barrel cam 400, the bearing 410, and the spring 412 which are included in the barrel cam actuator assembly 404. The spring housing and the spring thickness may be selected based on a desired maximum stroke of barrel cam. An axial clearance 430 between the bearing 410 and a side surface of the housing 408 is shown in FIG. 4B. The thickness 432 of the spring 412 is also shown in FIG. 4B. It will be understood that the maximum stroke of the barrel cam 400 may be the axial clearance 430 minus the spring thickness 432. The central axis 450 of the barrel cam 400 is again depicted in FIG. 4B.

In one specific use-case example, the maximum stroke may be in the range 0.6-0.8 millimeters (mm). However, numerous maximum stroke ranges are possible. More generally, the maximum stroke of the barrel cam may be smaller than a gap 434 between the barrel flank 436 and the housing 408. In case of face-to-face event, the resulting force will be transmitted by the cam follower to the barrel that will shift axially. Before reaching the end of stroke condition, the spring 412 may apply a load nearly proportional to the stroke itself, accumulating the power from the electric motor thus preventing its stall. When the favorable engaging condition is restored, the spring 412 provides the energy to complete the engagement. Upon reaching the end of stroke the spring 412 is flat and the barrel cam reaches a hard stop. The spring 412 may be designed as a cup spring for this reason. In the embodiment where the barrel cam includes multiple tracks, the maximum stroke is such that the resting forks (associated with a portion of the tracks) are not moved from their position, preventing unwanted engagement and disengagement. A resting fork denotes that a desired configuration of the fork during the range of barrel cam rotation remains unchanged. For instance, the resting shift fork allows the associated clutch to be sustained in a disengaged or engaged configuration. When the barrel cam reaches the hard stop the motor may stall. However, it will be understood the favorable engagement event for the clutch is more likely to happen before reaching the end of stroke in the barrel cam actuator assembly 404. The inner race 416, the roller elements 420, and the outer race 418 are again depicted in FIG. 4B.

Figure 5:
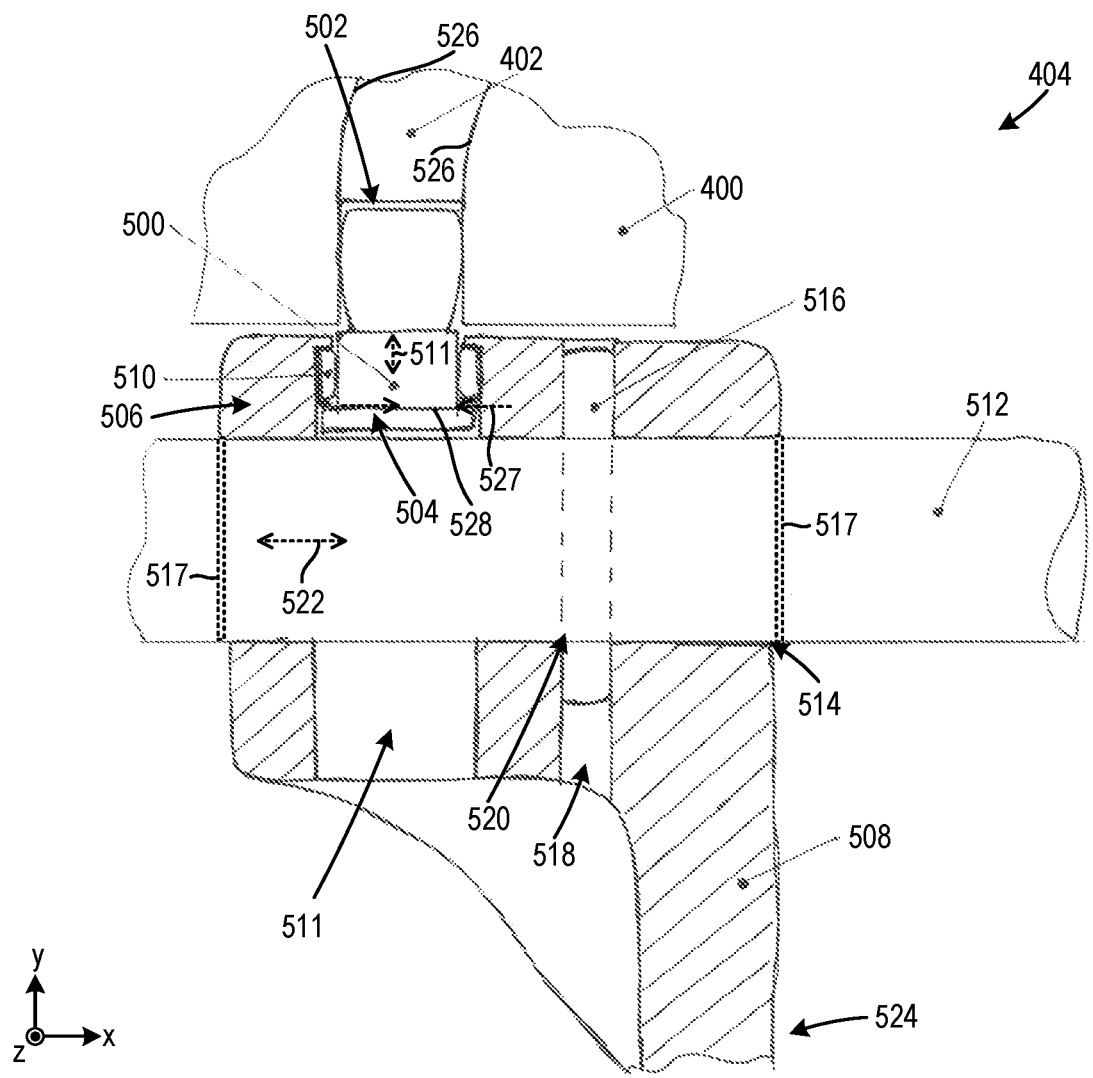

FIG. 5 shows a cross-sectional view of the barrel cam actuator assembly 404. The barrel cam 400 with the tracks 402 are again depicted. In the illustrated example, the barrel cam actuator assembly 404 further includes a cam follower 500 with a first end 502 that is mated with the one of the tracks 402 and a second end 504 that is mated with a section 506 (e.g., a body) of a shift fork 508. The first end 502 may be spherically shaped to enable smooth interaction between the barrel cam 400 and the cam follower 500.

The second end 504 of the cam follower 500 may be cylindrically shaped to function as an inner race of a bearing 510 which may at least circumferentially surround the cam follower 500. The bearing 510 and the cam follower 500 are positioned in an opening 511 in the shift fork 508. Further, a rotational axis 511 of the bearing 510 is provided for reference. The axis 511 may be perpendicular to the axis 522. However, other bearing configurations are possible.

The bearing 510 may specifically be a needle roller bearing to increase the assembly's space efficiency. However, other types of bearings may be used which may however increase the size of the system. Further, in another embodiment, another bearing (e.g., needle roller bearing) may be position on the opposing axial side of the cam follower 500 as the bearing 510.

In the illustrated example, a rod 512 extends through an opening 514 in the shift fork 508. To elaborate, the rod 512 may be sliding fit to the body of the shift fork 508 to enhance system assembly. For instance, the rod 512 may be slidingly coupled to the housing 408, shown in FIG. 4B, via bushings and/or other suitable components. However, other system configurations are possible. The rod 512 may be compliantly coupled to the shift fork 508 via a compliant pin 516. To elaborate, the compliant pin 516 may extend through openings 518 in the shift fork 508 and a bore 520 in the rod 512. The compliant pin 516 may have a substantially constant diameter along its length in one example. Further, the compliant pin 516 may be perpendicularly arranged with regard to a central axis 522 of the rod 512. Alternatively, circlips 517 may be used to attach the rod 512 to the shift fork 508. Still further in other examples, the pin and the circlips may be omitted from the assembly and the shift fork may be slidingly coupled to the rod. Even further in another example, the rod may be coupled to the shift fork via a circlip and an abutment. Still further in another example, the shift fork and the rod may be formed as an integrated component. The shift fork 508 includes a clutch interface 524 that may be in the form of fork arms that mate with a recess in a clutch.

In one use-case example, the diameter of the barrel cam may be greater than 65 mm, the track may be 8-10 mm wide and 6-7 mm deep. Further, the stroke from a neutral state to an engaged state may be 9 mm. However, barrel cams with a wide variety of dimensions that may or may not be with these ranges may be utilized, in other embodiments.

In one specific use-case example, the clearance between the end 502 of the cam follower 500 and the track sides 526 may be in the range 0.05-0.1 mm. In such an example, a radius 527 of the tip 528 of the cam follower 500 may be in the range of 25-30 mm. Designing the cam follower with these dimensions enable unwanted hysteresis to be avoided, in some cases. However, it will be appreciated that the cam follower may have a variety of dimensions, in alternate embodiments, which may also be capable of decreasing the chance of undesirable hysteresis.

It will be appreciated that the other tracks in the barrel cam 400, which are obscured from view in FIG. 5, may be similarly attached to other shift forks via cam followers which mate with the track and are attached to the associated shift fork via a bearing (e.g., a needle roller bearing).

Figure 6:
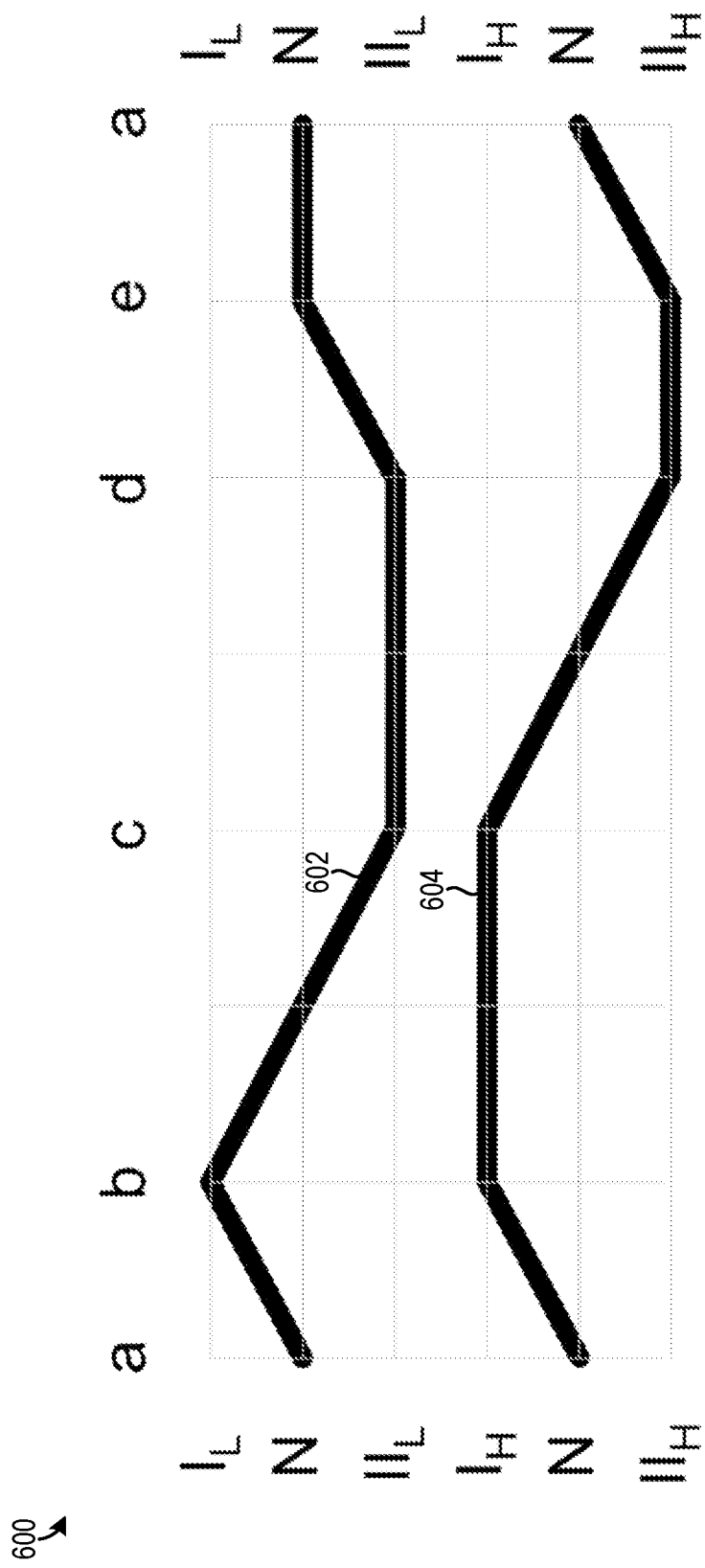
FIG. 6 shows an illustration of an exemplary barrel cam tracks.

FIG. 6 shows an exemplary flat pattern layout 600 for a barrel cam with two tracks. Positions a, b, c, d, and e denote different rotational positions of the barrel cam. $I_L$, N, and $II_L$ denote the position of a first clutch that corresponds to the track 602. $I_H$, N, and $II_H$ denote the positions of a second clutch that corresponds to the track 604. Thus, each of the associated clutches have two engaged positions and one neutral position, in the illustrated example. However, clutches with a fewer or greater number of positions may be used in other examples. Please note that in the illustrated example, there are seven possible states for the barrel cam. Further, in the illustrated example, whenever a fork is moving (e.g., position d to e, upper sloping line) the other is steady (lower horizontal track). However, in the illustrated example, this does not apply to the transition from position a to b. Further, in the illustrated example, position a is a true neutral state of the transmission and may be used during towing, for example. It will be understood, that the flat pattern layout is exemplary in nature and the barrel cam may have many different track patterns whose layout may be determined based on the transmission architecture, shifting performance, end-use design goals, and the like, for example.

FIGS. 7A-7B show an example of a dog clutch 700. To elaborate, the dog clutch is in the form of a face type dog clutch with two sections 701 which each include teeth 702 on faces 704 of the clutch sections. The teeth engage and disengage to permit and inhibit torque transfer through the clutch. The dog clutch 700 may be engaged and disengaged by any of the barrel cam actuation assemblies described herein.

FIG. 8 shows an example of a dog clutch 800 (e.g., a dog clutch with a tipped end to facilitate engagement) where the gear 802 can rotate on the shaft 804 being separated by a needle roller bearing. In the illustrated example, the hub 806 has an inner spline 808 that may be permanently mated with the spline 810 so that the hub is rotatably connected to the shaft. The hub may also be axially fixed to the shaft by a couple of circlips. Further, in the illustrated example, the sleeve 812 is rotatably connected to the hub by the spline pairs 816 and 818 can slide on it. A shift fork will drive axially the sleeve 812 by means of the groove 814. When the sleeve is forced towards the gear the spline 816 will couple with both the splines 820 and 818 thus rotatably connecting the gear and the shaft. The dog clutch 800 shown in FIG. 8 does not include friction cones. However, other types of clutches have been contemplated such a synchronizer which makes use of friction cones. The dog clutch 800 may be engaged and disengaged by any of the barrel cam actuation assemblies described herein.

Figure 9:
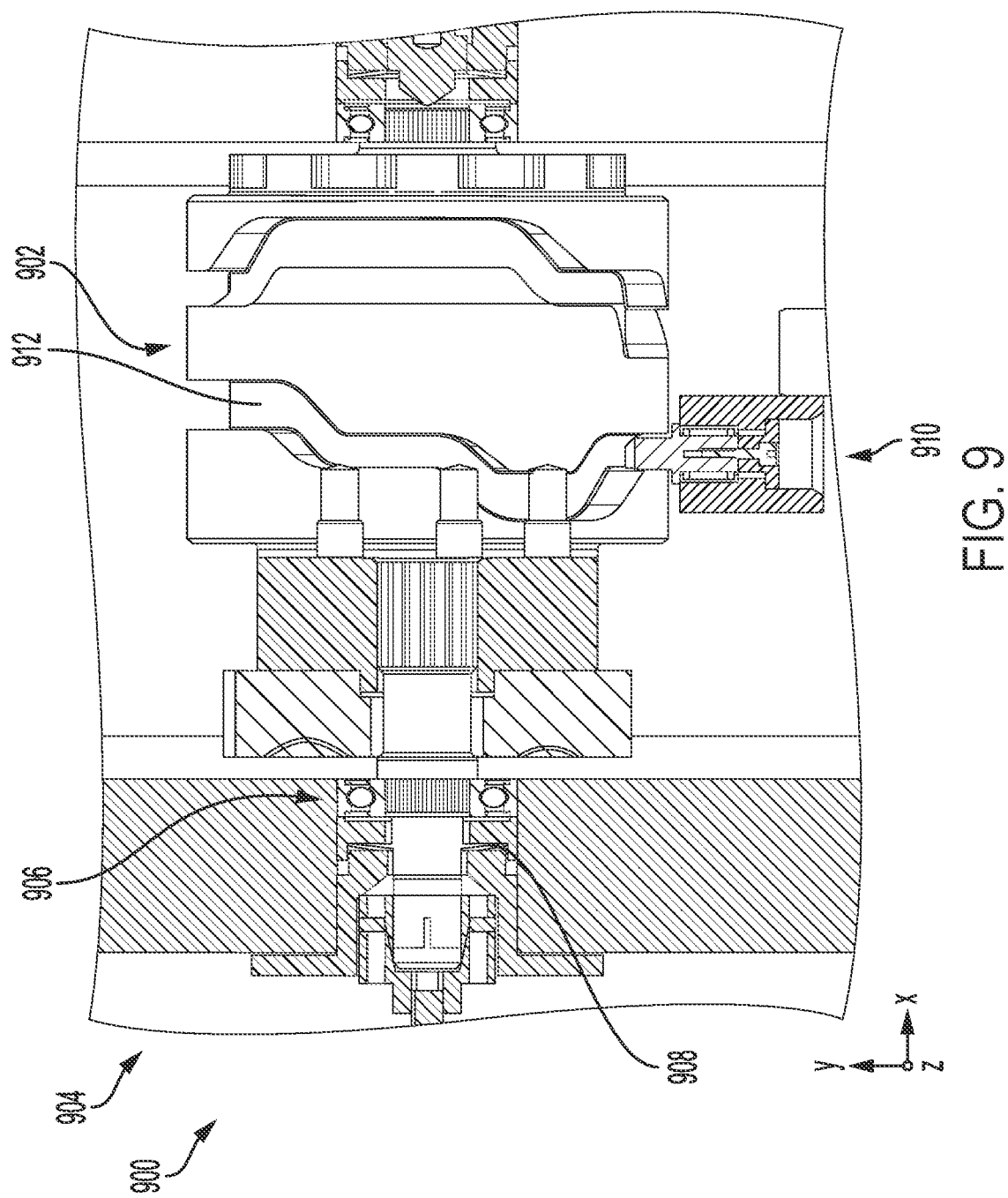
FIG. 9 shows another example of a barrel cam actuator assembly.

FIG. 9 shows another example of a barrel cam actuator assembly 900 with a barrel cam 902 that is elastically and rotatably mounted in a housing 904 via bearings 906 and springs 908 (e.g., cup springs). The barrel cam actuator assembly 900 further includes a cam follower 910, in the illustrated example. The cam follower 910 interfaces with one of the tracks 912 in the barrel cam 902. The barrel cam actuator assembly 900 may share overlapping structural and functional characteristics with the other actuator assemblies described herein and vice versa. Therefore, redundant description of these overlapping features is omitted for brevity.

FIGS. 1-9 provide for a method of operation of a barrel cam actuator assembly. The method includes rotating a barrel cam based on a shift condition. The shift condition may be an operator's request to change gear based on an interaction with a gear shift interface or an automatic shift condition which is generated based on a change in vehicle speed and/or load. In one example, rotating the barrel cam includes energizing an actuation motor which is rotationally coupled to the barrel cam. As indicated above, the method may be implemented by a controller (e.g., ECU) in conjunction with any of the barrel cam actuator assemblies described herein or combinations of the barrel cam actuator assemblies. However, in other examples, the method may be carried out via other suitable barrel cam actuator assemblies.

FIGS. 2A-5 and 7A-9 are drawn approximately to scale, although alternate component dimensions may be used in other embodiments. FIGS. 1-5 and 7A-9 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention will be further described in the following paragraphs. In one aspect, a barrel cam actuator assembly is provided that comprises a barrel cam including a first track; a first bearings that is positioned at one side of the barrel cam; and a spring that is positioned between a housing and the first bearing; wherein the first bearings and the spring are configured to provide axial compliance to the barrel cam. In one example, the barrel cam actuator assembly may further comprise a shift fork coupled to a rod via a compliant pin, coupled to the rod via a circlip, or sliding coupled to the rod.

Further, in one example, the barrel cam actuator assembly may further comprise a cam follower including a first end positioned within one track and a second end positioned within the shift fork via a second bearing. Still further, in one example, the second bearing may be a needle roller bearing. In another example, the cam follower may include a rounded end. Further, in one example, the spring may be a cup spring. In one example, the first bearing may be a ball bearing. Still further, in one example, the barrel cam may include a second track configured to actuate a shift fork based on a rotational position of the barrel cam. In one example, the barrel cam actuator assembly may be included in an electric powertrain. Still further in one example, the spring may be included in a pair of springs, the first bearing may be included in a pair of bearings, and preload forces exerted on the pair of bearings via the pair of springs may be substantially equivalent. Further, in one example, the barrel cam may include multiple tracks and wherein a compliant stroke of the barrel cam is configured to prevent disengagement and engagement of resting shift forks that correspond to a portion of the multiple tracks.

In another aspect, a method for operation of a barrel cam actuator assembly is provided that comprises rotating a barrel cam based on a shift condition; wherein the barrel cam actuator assembly comprises: a barrel cam including a first track; a pair of bearings that are positioned at opposing sides of the barrel cam; and a pair of springs that are each positioned between a housing and one of the bearings in the pair of bearings; wherein the pair of bearings and the pair of springs are configured to provide axial compliance to the barrel cam. Further in one example, rotating the barrel cam may include energizing an actuation motor which is rotationally coupled to the barrel cam. Further, in one example, the barrel cam actuator assembly may further comprise a cam follower including a first end positioned within one track and a second end positioned within the shift fork via a bearing.

In another aspect, a barrel cam actuator assembly is provided that comprises a barrel cam including a first track; a pair of bearings that are positioned at opposing sides of the barrel cam; a pair of springs that are each positioned between a housing and one of the bearings in the pair of bearings; a first shift fork coupled to a rod; and a cam follower including a first end positioned within one track and a second end positioned within the first shift fork via a bearing; wherein the pair of bearings and the pair of springs are configured to provide axial compliance to the barrel cam. Further, in one example, the first pair of bearings may be a pair of ball bearings and the bearing is a needle roller bearing. In one example, the barrel cam actuator assembly may further comprise an actuation motor rotationally coupled to the barrel cam. Further, in one example, the first shift fork may be coupled to a dog clutch or a synchronizer. In one example, inner races of the bearings in the pair of bearings may be press fit to surfaces of the barrel cam and outer races of the bearings in the pair of bearings may be sliding fit to the housing. Still further, in one example, the pair of springs may be cup springs that are equivalently preloaded.

Note that the example control and estimation routines included herein can be used with various system (e.g., powertrain) configurations. The control methods and routines disclosed herein may be stored as executable instructions in non-transitory memory and may be carried out by the control system including the controller in combination with the various sensors, actuators, and other system hardware in combination with the electronic controller. As such, the described actions, operations, and/or functions may graphically represent code to be programmed into non-transitory memory of the computer readable storage medium in the vehicle and/or powertrain control system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of traction motors, internal combustion engines in some instances, transmissions, and the like. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A barrel cam actuator assembly comprising:
 a barrel cam including a first track;
 a first bearing that is positioned at one side of the barrel cam;
 a spring that is positioned on an outboard axial side of the first bearing, wherein the spring is axially interposed between a wall of a housing and the first bearing and wherein an inner axial side of the first bearing is directly adjacent to the barrel cam;
 a shift fork coupled to a shift fork rod and including prongs that interface with a shift sleeve of a dog clutch;
 a cam follower including:
  a first end mated with the first track; and
  a second end mated with an opening in the shift fork; and
 a second bearing positioned within the opening in the shift fork;

wherein the first bearing and the spring are configured to provide axial compliance to the barrel cam;

wherein a rotational axis of the second bearing is perpendicular to a central axis of the shift fork rod; and wherein the inner race of the first bearing is press fit to a surface of the barrel cam and an outer race of the first bearing is sliding fit to the housing.

2. The barrel cam actuator assembly of claim 1, wherein the shift fork is coupled to the shift fork rod via a compliant pin.

3. The barrel cam actuator assembly of claim 1, wherein the second bearing is a needle roller bearing.

4. The barrel cam actuator assembly of claim 1, wherein the second end of the cam follower is cylindrically shaped.

5. The barrel cam actuator assembly of claim 1, wherein the spring is a cup spring.

6. The barrel cam actuator assembly of claim 1, wherein the first bearing is a ball bearing.

7. The barrel cam actuator assembly of claim 1, wherein the barrel cam includes a second track configured to actuate the shift fork based on a rotational position of the barrel cam.

8. The barrel cam actuator assembly of claim 1, wherein the barrel cam actuator assembly is included in an electric powertrain.

9. The barrel cam actuator assembly of claim 1, wherein the first bearing is included in a pair of bearings, the spring is included in a pair of springs, and preload forces exerted on the pair of bearings via the pair of springs are substantially equivalent.

10. The barrel cam actuator assembly of claim 1, wherein the barrel cam includes multiple tracks and the first track is included in the multiple tracks.

11. A barrel cam actuator assembly, comprising:
a barrel cam including a first track;
a pair of bearings that are positioned at opposing sides of the barrel cam;
a pair of springs that are each positioned on an outboard axial side of one of the bearings in the pair of bearings, wherein the pair of springs are each axially interposed between a wall of a housing and one of the bearings in the pair of bearings and wherein an inner axial side of each of the bearings in the pair of bearings are directly adjacent to the barrel cam;
a shift fork coupled to a shift fork rod and including prongs that interface with a shift sleeve of a dog clutch;
a cam follower including:
a first end positioned within the first track; and
a second end positioned within an opening in the first shift fork; and
a needle roller bearing positioned within the opening in the shift fork;
wherein the pair of bearings and the pair of springs are configured to provide axial compliance to the barrel cam; and
wherein a rotational axis of the needle roller bearing is perpendicular to a central axis of the shift fork rod.

12. The barrel cam actuator assembly of claim 11, wherein the second bearing is a needle roller bearing.

13. The barrel cam actuator assembly of claim 11, further comprising an actuation motor rotationally coupled to the barrel cam.

14. The barrel cam actuator assembly of claim 11, wherein the pair of bearings are ball bearings.

15. The barrel cam actuator assembly of claim 11, wherein inner races of the bearings in the pair of bearings are press fit to surfaces of the barrel cam and outer races of the bearings in the pair of bearings are sliding fit to the housing.

16. The barrel cam actuator assembly of claim 11, wherein the pair of springs are cup springs that are equivalently preloaded.

* * * * *